United States Patent [19]

Hayes

[11] Patent Number: 5,986,431
[45] Date of Patent: Nov. 16, 1999

[54] BATTERY POWER SYSTEM FOR VEHICLES

[75] Inventor: Gary M. Hayes, Eagan, Minn.

[73] Assignee: GNB Technologies, Inc., Mendota Heights, Minn.

[21] Appl. No.: 09/049,506

[22] Filed: Mar. 27, 1998

Related U.S. Application Data

[63] Continuation-in-part of application No. 08/751,846, Nov. 18, 1996, Pat. No. 5,767,658.

[51] Int. Cl.$^6$ ..................................... H01M 10/46
[52] U.S. Cl. ........................... 320/112; 429/100; 429/178
[58] Field of Search ................... 320/107, 110, 320/112; 429/9, 96, 99, 100, 151, 170, 178

[56] References Cited

U.S. PATENT DOCUMENTS

| | | | |
|---|---|---|---|
| 858,478 | 7/1907 | Sessions | 307/31 |
| 1,632,535 | 6/1927 | Breeden et al. | 429/1 |
| 3,021,469 | 2/1962 | Ganiere et al. | 320/125 |
| 3,029,301 | 4/1962 | Strider | 307/112 |
| 3,167,458 | 1/1965 | Brazell | 429/10 |
| 3,694,729 | 9/1972 | Jones | 307/150 |
| 3,718,848 | 2/1973 | Hines | 320/117 |
| 4,239,839 | 12/1980 | McDowall et al. | 429/154 |
| 4,770,954 | 9/1988 | Noordenbos | 429/9 |
| 5,108,848 | 4/1992 | Kramer | 429/9 |
| 5,154,985 | 10/1992 | Tanaka | 429/9 |
| 5,162,164 | 11/1992 | Dougherty et al. | 429/9 |
| 5,162,720 | 11/1992 | Lambert | 429/9 |
| 5,223,351 | 6/1993 | Wruck | 429/9 |
| 5,225,761 | 7/1993 | Albright | 320/117 |
| 5,378,552 | 1/1995 | Dixon, Jr. | 429/91 |
| 5,418,444 | 5/1995 | Cook et al. | 320/125 |
| 5,488,283 | 1/1996 | Dougherty et al. | 307/10.1 |
| 5,602,459 | 2/1997 | Rogers | 320/138 |
| 5,767,658 | 6/1998 | Hayes | 320/123 |

*Primary Examiner*—Edward H. Tso
*Attorney, Agent, or Firm*—Leydig, Voit & Mayer Ltd.

[57] ABSTRACT

A battery pack for providing electrical power to a commercial tractor/trailer vehicle has two 12-volt high-CCA batteries connected in parallel and two 6-volt deep-cycle batteries connected in series to power 12-volt electrical accessories such as devices for creature comforts. The two 12-volt high-CCA batteries provide sufficient cold cranking current for starting the engine of the vehicle. The two 6-volt deep-cycle batteries connected in series are used to power electrical accessories such as devices for creature comforts when the engine is not operating. A switch connects the serially connected 6-volt deep-cycle batteries in parallel with the 12-volt batteries for charging when the engine is running and isolates the 6-volt deep-cycle batteries from the 12-volt high-CCA batteries when the engine is off. The two 12-volt high-CCA batteries may alternatively be replaced with one large 12-volt high-CCA battery.

3 Claims, 2 Drawing Sheets

BATTERY POWER SYSTEM FOR VEHICLES

This application is a continuation-in-part of U.S. patent application 08/751,846 filed Nov. 18, 1996 now U.S. Pat. No. 5,767,658.

FIELD OF THE INVENTION

This invention relates generally to battery power systems for vehicles and, more particularly, to a battery power system for providing sufficient short-term power to start an internal combustion engine while also providing sufficient long-term power to operate electrical appliances during intervals when the internal combustion engine is not running.

BACKGROUND OF THE INVENTION

Unlike most automobiles, commercial tractor/trailer vehicles typically utilize large diesel engines requiring substantial amounts of short-term power (e.g. about 1800 amperes) to start the engine. Such large current demands result from, among other things, the requirements of the fuel injection systems of such engines. In order to satisfy the large current demands of the diesel engines, commercial tractor/trailer vehicles are typically equipped with battery power systems including a plurality of high cold-cranking-ampere (CCA) batteries connected in parallel.

Supplying high cold-cranking current is not the only requirement for battery power systems used in commercial tractor/trailer vehicles. Such systems must also provide electrical power during times when the engine is not running. Of course, while the engine is running, ample electrical energy is usually provided by the alternator to operate such electrical devices as communication equipment, radios, lights, and other creature-comfort devices including microwave ovens, electric blankets, televisions, video tape recorders, etc. However, when the engine is not running, if any electrical devices are to be powered, they must be powered by the battery power system or an alternative system.

In earlier battery power systems, 12-volt batteries were utilized to both start the engine and run any electrical appliances when the engine was not running. Such systems experienced very significant problems, in that the electrical appliances would run the batteries down to the point that they would be unable to start the engine when required. This often occurred if the electrical appliances were run for a long period of time. In order to prevent this situation from occurring, systems were developed to isolate some batteries from the electrical appliances during times when the engine is not running. Those batteries would then only be used to start the engine.

Presently, a so-called "3+1" battery power system is used to start the engine and power any electrical accessories when the engine is off. This system uses four "Group 31" 12-volt batteries which are typically enclosed in a battery box. "Group 31" refers to the size and shape of the battery which is the industry standard for commercial tractor/trailers. To guarantee sufficient cold-cranking current, three of the Group 31 12-volt batteries are connected in parallel and used only for starting the engine. The remaining battery (the "+1" battery) is used exclusively for the key-off operation of the electrical accessories. When the engine is off, the accessory battery is isolated from the starting batteries. After the engine is started, the accessory battery is switched in parallel with the starting batteries so that it can be charged by the engine's alternator.

Although isolation power systems such as the 3+1 battery power system ensure sufficient starting power by preserving the charge on the starting batteries, such systems work at the expense of providing power for electrical accessories while the engine is off. As a result, several alternatives have emerged to deal the limitations of these battery power systems. For example, a small minority of tractor/trailers are equipped with small diesel-powered generators to supply electrical energy to the appliances while the main diesel engine is off.

Where the tractor/trailer is not equipped with such generators as is the usual case, the drivers may elect to run the engine while they are resting or may choose to run the accessory battery down until it completely runs out of energy. Since running the engine is very expensive and potentially dangerous, many drivers choose to completely drain the accessory battery. Due to such repeated over-discharging, the accessory battery in a 3+1 battery power system cannot be fully recharged in many instances during normal operation of the vehicle. This causes a significant reduction of service life of the accessory battery. In fact, it is quite common for accessory batteries to need replacement every two or three months.

The fundamental problem with 3+1 battery power systems is that they fail to provide key-off power for an adequate amount of time. For example, during cold winter nights, a driver may depend on an electrical blanket to keep warm. Even if the driver decides to let the accessory battery run until it is out of energy, the driver will loose power well before he or she is ready to drive again. Typically, the accessory battery is at a low state of charge when asked to provide power, which significantly reduces the time the driver may use the blanket. In such a case, the electrical blanket will cease to work during the night. This is obviously unacceptable.

SUMMARY OF THE INVENTION

In view of the foregoing, it is a primary object of the present invention to provide a battery power system for a vehicle such as a commercial tractor/trailer vehicle that, besides having sufficient starting power, is capable of providing sufficient power for a sufficient time during periods when the engine is off so that electrical accessories and creature-comfort devices may be run by the battery power system.

It is a related object of the invention to provide a battery power system for a vehicle which, while supplying the required electrical energy, extends the service life of the individual batteries by not requiring them to be completely discharged during normal operation.

Due to the wide-spread use of 3+1 battery power systems, it is a more specific object of the present invention to provide a battery power system for a vehicle which, while supplying the required electrical energy, can be mounted in a typical battery box designed for a 3+1 battery power system, resulting in easy retrofitting.

In accordance with these and other objects of the present invention, there is provided a battery power system for vehicles such as commercial tractor/trailers that has a starting battery module having one or more high-CCA batteries for starting the engine and an accessory battery module having one or more deep-cycle batteries for powering electrical accessories in the vehicle when the engine is off. The battery power system further includes a switch which connects the accessory battery module and the starting battery module when the engine is running so that both modules may be charged by the alternator, and disconnects or isolates the two battery modules when the engine is off.

In a preferred embodiment, the starting battery module includes two 12-volt high-CCA batteries connected in parallel, and the accessory battery module includes two 6-volt deep-cycle batteries connected in series to provide a 12-volt power supply to run the accessories. The external dimensions of the 6-volt batteries are preferably identical to the 12-volt batteries so that the batteries can fit in a battery designed for a typical 3+1 battery box. Alternatively, the two 12-volt batteries may be replaced with one large 12-volt battery having a size that is the same as the combined size of the two 12-volt batteries.

Other objects and advantages will become apparent with reference to the following detailed description when taken in conjunction with the drawings. While the drawings and the detailed description show a specific preferred embodiment of the present invention, the invention is susceptible of various modifications and alternative constructions. Thus, it should be understood, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Figure 1:
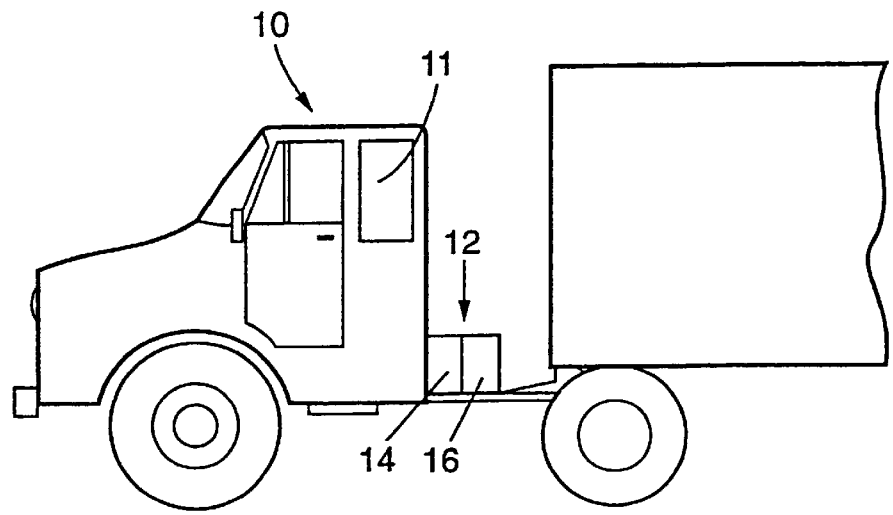
FIG. 1 is general diagram showing a battery power system according to the present invention mounted in a commercial tractor/trailer vehicle.

Turning now to the drawings, FIG. 1 shows a commercial tractor/trailer vehicle 10 equipped with a battery power system constructed according to the present invention. In the illustrated embodiment, the battery power system includes a battery pack 12 mounted behind the cab 11 of the commercial tractor/trailer vehicle.

The battery pack 12 includes a starting battery module 14 coupled to the starting system of the vehicle 10. The starting battery module 14 has at least one high-CCA battery and is capable of providing sufficient cold-cranking current for powering the starting system to start the engine of the vehicle 10. While the high-CCA batteries are designed to provide maximum available current on demand, they are not optimized for long-term discharge capacity and deep-cycle capability. Thus, these batteries cannot meet the cycling demands for operating electrical accessories of the vehicle 10 during key-off periods.

In accordance with an aspect of the present invention, the battery pack 12 further includes an accessory battery module 16 with at least one deep-cycle battery. The accessory battery module 16 has sufficient ampere-hour (AH) capacity and cycling capability to meet the demands for operating electrical accessories during regular key-off periods.

Figure 2:
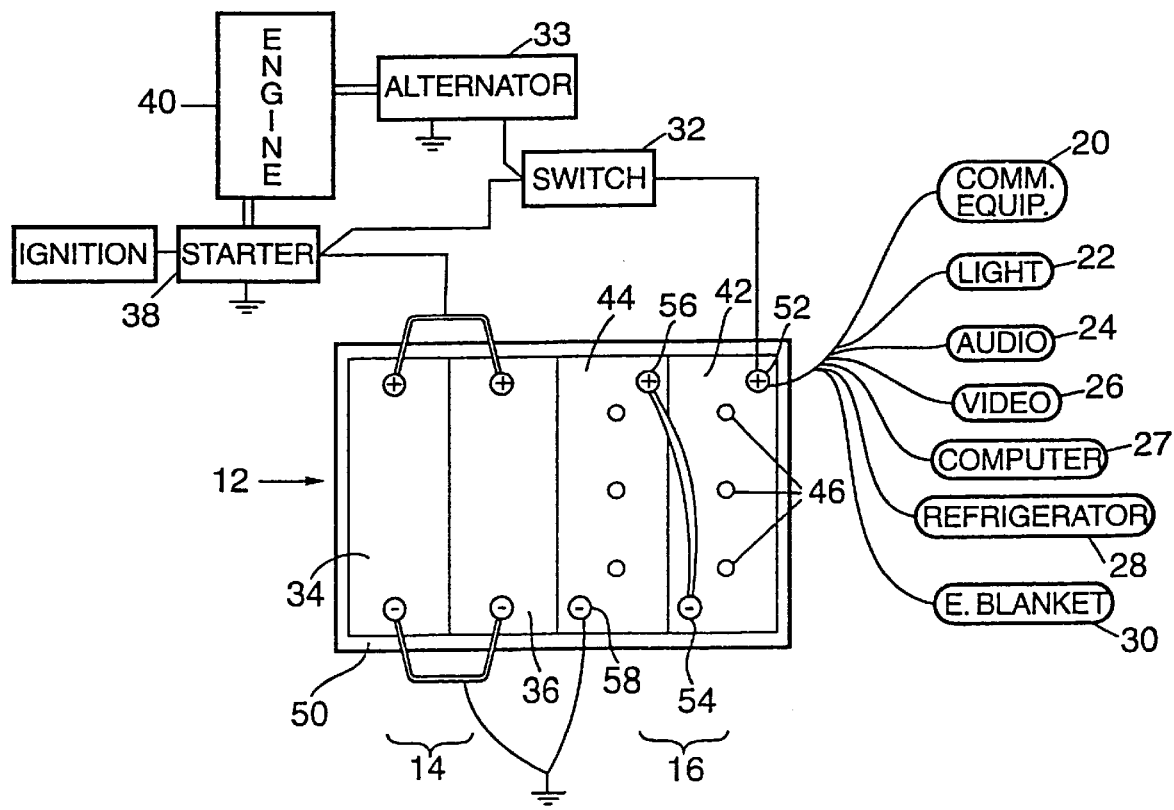
FIG. 2 is a schematic diagram of the preferred embodiment of the battery power system which is the subject of the present invention.

As illustrated in FIG. 2, the accessory battery module 16 may be used to provide electrical power to a variety of electrical accessories such as communication equipment 20, lights 22, audio equipment 24 such as radios, video equipment 26 such as televisions, computer equipment 27, a refrigerator 28, an electrical blanket 30, etc., either by semi-permanent wiring or by means of plug-in outlets. A variety of other accessories can, of course, be powered by the accessory battery module to provide necessary functions or creature comforts.

As illustrated in FIG. 2, the battery power system includes a switch 32 for connecting the accessory battery module 16 to the alternator 33 of the vehicle when the engine 40 is running. Similar isolator switches have been used in the past in the 3+1 battery systems described above. In the preferred embodiment, the switch 32 is a solenoid switch coupled to the alternator 33 so that after the engine is started the electrical energy generated by the alternator 33 flows into the solenoid of the switch 32 to close the switch. The closing of switch 32 connects the accessory battery module 16 and the starting battery module 14 in parallel so that both battery modules may be charged by the alternator 33. When the engine 40 is turned off, the switch 32 is in the open position and the accessory battery module 16 is isolated from and not in parallel with the starting battery module 14 so that the latter is not used for the key-off operation of the electrical accessories. While the switch 32 has been described as a solenoid switch, other switches could be substituted such as mechanical switches or solid-state diode isolator units among others.

In the illustrated embodiment, the starting battery module 14 includes two 12-volt Group 31 batteries 34, 36. The 12-volt batteries are of standard heavy-duty high-CCA design. They are connected in parallel to provide sufficient cold cranking current for the starter 38 to start the engine 40. Each of the 12-volt batteries 34, 36 preferably has a BCI (Battery Council International) CCA rating of 925 amperes such that the starting battery module 14 is capable of providing more than 1800 amperes for starting a typical commercial tractor/trailer diesel engine.

In accordance with a feature of the preferred embodiment of the invention, the accessory battery module 16 includes two 6-volt deep-cycle batteries 42, 44 connected in series to provide a 12-volt output voltage. The 6-volt batteries 42, 44 are of a deep-cycle construction which includes the use of high density active material, plates with high antimony concentration, and a combination of glass mat and polyethylene separator material. Such construction promotes charge acceptance, deep-cycling ability, and capacity retention. "Deep-cycling" refers to the battery's ability to be substantially discharged and recharged multiple times while maintaining satisfactory discharge capacity and service life. The deep-cycle batteries 42, 44 have individual vent caps 46 equipped with flame arrestor disks which may be removed for routine maintenance such as adding water to the battery cells.

In accordance with another feature of the preferred embodiment, the two deep-cycle batteries 42, 44 have the same external dimensions of the two Group 31 12-volt batteries 34, 36. In this way, with the two 12-volt high-CCA batteries and two 6-volt deep-cycle batteries, the battery system can be fitted in the battery box 50 of an existing 3+1 system. The hold-down brackets of existing battery boxes may be used with little or no modification. Thus, vehicles with existing 3+1 systems can be easily retrofitted with the system of the illustrated preferred embodiment.

In the preferred embodiment, the stud terminals 52, 54, 56, 58 of the deep-cycle 6-volt batteries 42, 44 have the same ⅜" dimension as those on the Group 31 batteries 34, 36 in the starting battery module, but are located near the corners of the batteries. A series 2/0 cable 60 connects the positive terminal 56 of the battery 44 to the negative terminal 54 of the battery 42 to form a serial connection. The serial connection is the preferred way to connect the deep-cycle batteries, because the batteries would experience the same discharge and charge currents, thereby avoiding the likelihood of unbalanced performance of the batteries.

A direct beneficial result of the similar dimensions of the 12-volt and 6-volt batteries is that the combination of the two 6-volt deep-cycle batteries 42, 44 provides significantly superior ampere-hour (AH) discharge and cycle life characteristics as compared to regular Group 31 batteries. Generally, the ampere-hour capacity of a battery is determined by the amount of plates and active material that can be incorporated into each of the 2-volt cells of the battery. Since the 6-volt batteries 42, 44 are of similar over-all size to that of the Group 31 12-volt batteries 34, 36, the 2-volt cells of the 6-volt batteries are significantly larger than those of the 12-volt batteries. The increased cell size and the corresponding increase in the active material in the cell provide enhanced ampere-hour capacity of about 140 AH (based on a ten hour discharge rate). This increased capacity coupled with the deep-cycle construction of the batteries 42, 44 allows the accessory battery module to effectively meet the expected system demand for key-off operation (preferably at least 10 amperes for 10 hours).

Figure 3:
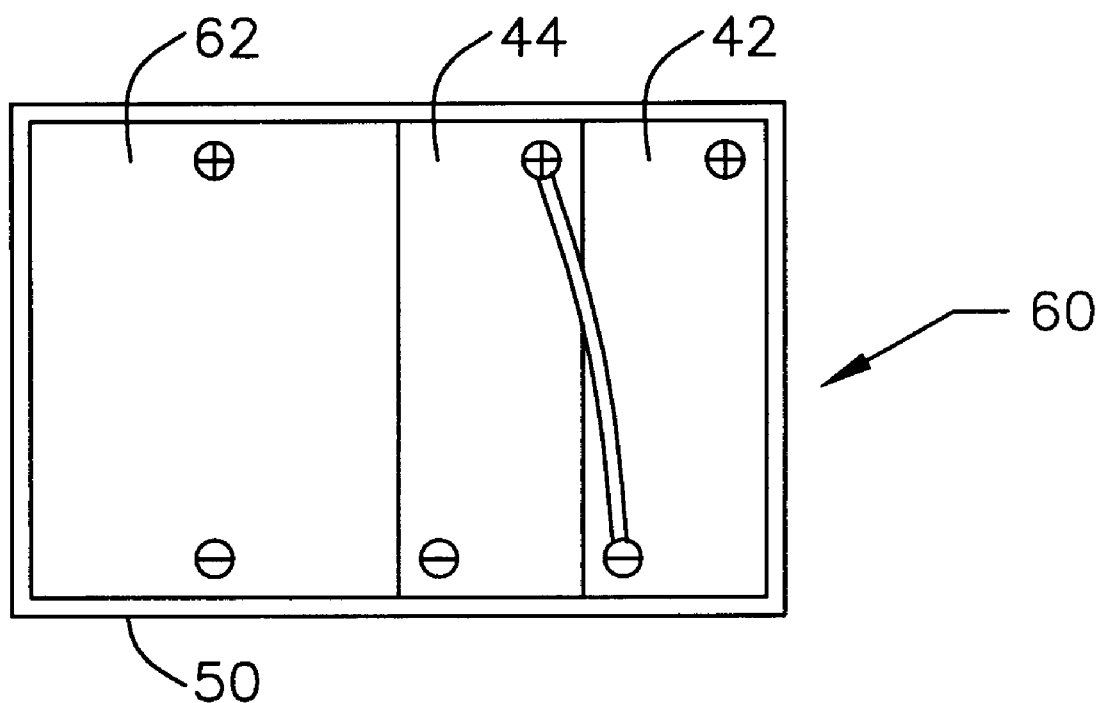
FIG. 3 is a schematic diagram of an alternative embodiment of a battery pack constructed according to the invention.

In an alternative embodiment shown in FIG. 3, a battery pack 60 constructed according to the invention includes one 12-volt high-CCA battery 62 and two 6-volt deep-cycle batteries 42 and 44 mounted in the battery box 50. The two 6-volt batteries are connected in series to provide a 12-volt output. This embodiment differs from that of FIG. 2 in that the two 12-volt high-CCA batteries 34 and 36 in the embodiment of FIG. 2 are replaced by one large 12-volt high-CCA battery 62. The battery 62 is preferably twice the size of a Group battery such that the combination of the large 12-volt battery 62 and the two 6-volt batteries 42 and 44 properly fit in a battery box designed for the conventional 3+1 battery pack.

Consequently, a battery power system is provided which avoids the prior problems which have been experienced. The system enables the use of many electrical devices which could not effectively have been used before without special and expensive generators.

What is claimed is:

1. A 6-volt battery comprising:

a housing having external dimensions identical to external dimensions of a Group 31 battery; and two stud terminals mounted on a top panel of the housing for providing a 6-volt output voltage, each of the stud terminals having a diameter identical to a diameter of stud terminals on a Group 31 battery.

2. A 6-volt battery as in claim 1, wherein each of the stud terminals is positioned adjacent a corner of the housing of the battery.

3. A 6-volt battery comprising:

a housing having external dimensions identical to external dimensions of a Group 31 battery; and two stud terminals mounted on a top panel of the housing for providing a 6-volt output voltage.

* * * * *